United States Patent
Levy et al.

(10) Patent No.: US 11,068,972 B2
(45) Date of Patent: Jul. 20, 2021

(54) METHOD, SYSTEM AND PRODUCT FOR A PARKING AUCTION

(71) Applicant: Anagog Ltd., Ramat Gan (IL)

(72) Inventors: Gil Levy, Ramot Meir (IL); Yaron Aizenbud, Haifa (IL)

(73) Assignee: ANAGOG LTD., Ramot Meir (IL)

(*) Notice: Subject to any disclaimer, the term of this patent is extended or adjusted under 35 U.S.C. 154(b) by 0 days.

(21) Appl. No.: 16/292,321

(22) Filed: Mar. 5, 2019

(65) Prior Publication Data
US 2019/0197613 A1 Jun. 27, 2019

Related U.S. Application Data

(62) Division of application No. 15/030,262, filed as application No. PCT/IL2014/050903 on Oct. 19, 2014.

(60) Provisional application No. 61/893,315, filed on Oct. 21, 2013.

(51) Int. Cl.

| | |
|---|---|
| G06Q 30/08 | (2012.01) |
| H04W 4/40 | (2018.01) |
| H04W 4/029 | (2018.01) |
| G06Q 10/02 | (2012.01) |
| G08G 1/14 | (2006.01) |
| G08G 1/00 | (2006.01) |

(Continued)

(52) U.S. Cl.
CPC ............. *G06Q 30/08* (2013.01); *G01C 21/34* (2013.01); *G06Q 10/02* (2013.01); *G08G 1/143* (2013.01); *G08G 1/144* (2013.01); *G08G 1/147* (2013.01); *G08G 1/205* (2013.01); *H04W 4/029* (2018.02); *H04W 4/40* (2018.02); *G06Q 2240/00* (2013.01); *H04W 4/21* (2018.02)

(58) Field of Classification Search
CPC .............................. G06Q 30/08; G06Q 10/02
See application file for complete search history.

(56) References Cited

U.S. PATENT DOCUMENTS

| | | | |
|---|---|---|---|
| 9,560,426 B1 * | 1/2017 | Daniel | H04L 67/125 |
| 2003/0144890 A1 * | 7/2003 | Dan | G06Q 10/02 |
| | | | 705/5 |

(Continued)

OTHER PUBLICATIONS

S. Hashimoto, R. Kanamori and T. Ito, "Auction-Based Parking Reservation System with Electricity Trading," 2013 IEEE 15th Conference on Business Informatics, Vienna, 2013, pp. 33-40, doi: 10.1109/CBI.2013.140. (Year: 2013).*

*Primary Examiner* — George Chen
*Assistant Examiner* — Wayne S. Murray

(57) ABSTRACT

A method, apparatus and product for parking auctions. One method comprises: detecting a parking exit event is about to occur for a vehicle in a parking spot; initiating a real-time auction between relevant drivers that are in a proximity of the parking spot and are searching for parking; selecting a winning bid from one or more bids for the parking spot, wherein the winning driver provided the winning bid; displaying locations over time of the winning driver, whereby the user can track the location of the winning driver; and notifying the user upon the winner driving arriving at the parking spot, whereby the user can vacate the parking spot for the winner driver. Another method comprises while a vehicle is searching for parking, participating, using a mobile device, in an auction for a parking spot.

20 Claims, 4 Drawing Sheets

(51) Int. Cl.
*G01C 21/34* (2006.01)
*H04W 4/21* (2018.01)

(56) References Cited

U.S. PATENT DOCUMENTS

| | | | |
|---|---|---|---|
| 2012/0004840 A1* | 1/2012 | Lee | G01C 21/3423 |
| | | | 701/465 |
| 2012/0095791 A1* | 4/2012 | Stefik | G08B 25/12 |
| | | | 705/5 |
| 2013/0018751 A1* | 1/2013 | Winslade | G06Q 30/02 |
| | | | 705/26.2 |
| 2014/0089206 A1* | 3/2014 | Hyde | G06Q 50/06 |
| | | | 705/80 |
| 2015/0178823 A1* | 6/2015 | Tanaka | G06Q 10/087 |
| | | | 705/26.3 |
| 2015/0279213 A1* | 10/2015 | Balter | G01C 21/36 |
| | | | 705/13 |

* cited by examiner

METHOD, SYSTEM AND PRODUCT FOR A PARKING AUCTION

CROSS-REFERENCE TO RELATED APPLICATION

This application claims the benefit of U.S. Provisional Application No. 61/893,315 filed Oct. 21, 2013, entitled "Parking Auction", which is hereby incorporated by reference in its entirety.

TECHNICAL FIELD

The present disclosure relates to computer-aided parking, in general, and to a system for performing parking auction, in particular.

BACKGROUND

Finding a parking spot for a vehicle may be a hard task. In densely populated areas, or where on-street parking is sparse, a driver may rely on luck, knowledge of unfamiliar parking spots, or simply waste time searching for a parking spot that becomes available.

One strategy of some drivers is to wait in certain locations in the hope of seeing another driver walking to her car and exiting a near-b) parking. Another strategy is to continue driving until a parking spot is found. In either way, the drivers may prefer to search for the parking in a location that is relatively close (e.g., within a reasonable walking distance) from their target destination. In many cases, a driver that did not find a parking spot would give up and prefer to search for a paid parking spot instead of spending more time searching for free or cheap parking.

BRIEF SUMMARY

One exemplary embodiment of the disclosed subject matter is a method comprising: detecting, by a mobile device, a parking exit event is about to occur for a vehicle in a parking spot; initiating a real-time auction between relevant drivers that are in a proximity of the parking spot and are searching for parking, whereby one or more bids for the parking spot are provided, wherein each bid comprises a compensation for the parking spot; and selecting a winning bid from the one or more bids, wherein the winning bid is associated with a winning driver; displaying to a user of the mobile device, in real time, locations over time of the winning driver, whereby the user can track the location of the winning driver; and notifying the user upon the winner driving arriving at the parking spot, whereby the user can vacate the parking spot for the winner driver.

Another exemplary embodiment of the disclosed subject matter is a method comprising: while a vehicle is searching for parking, participating in a real-time auction for a parking spot, wherein said participating is performed by a mobile device of a user located within the vehicle; wherein said participating comprises: retrieving a list of active auctions for parking spots in a proximity of a location of the vehicle and a target destination of the user; selecting an auction from the list of active auctions; and providing a bid in the auction.

Yet another exemplary embodiment of the disclosed subject matter is a computerized apparatus having a processor, the processor being adapted to perform the steps of: detecting, by a mobile device, a parking exit event is about to occur for a vehicle in a parking spot; initiating a real-time auction between relevant drivers that are in a proximity of the parking spot and are searching for parking, whereby one or more bids for the parking spot are provided, wherein each bid comprises a compensation for the parking spot; and selecting a winning bid from the one or more bids, wherein the winning bid is associated with a winning driver; displaying to a user of the mobile device, in real time, locations over time of the winning driver, whereby the user can track the location of the winning driver; and notifying the user upon the winner driving arriving at the parking spot, whereby the user can vacate the parking spot for the winner driver.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
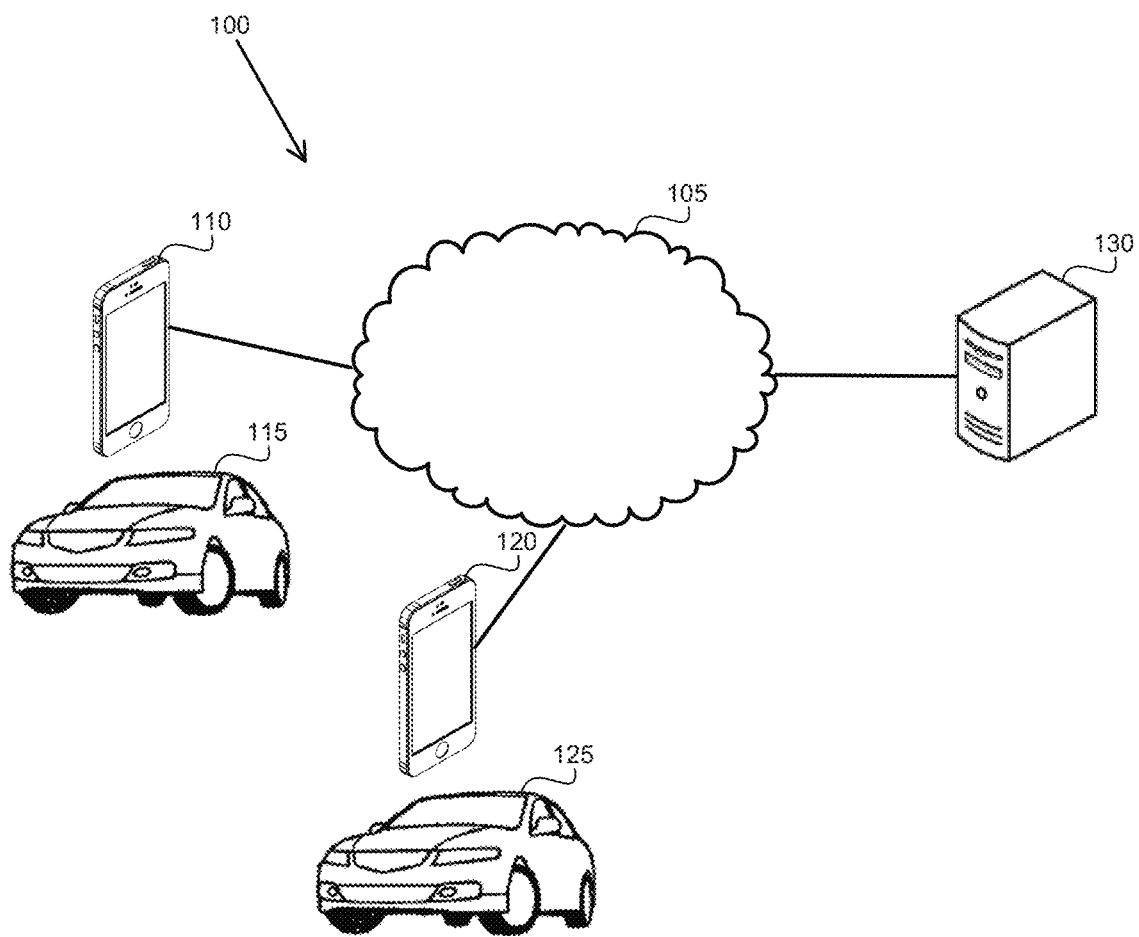
FIG. 1 shows an illustration of a computerized environment, in accordance with some exemplary embodiments of the disclosed subject matter.

In the present disclosure, a "mobile device" is a device that is non stationary, such as a mobile phone, a Personal Digital Assistant (PDA), a tablet computer, or the like. The mobile device may be mounted on a vehicle or carried by a user. The mobile device may have computing capabilities and may comprise sensors, such as but not limited to positioning module, an accelerometer, an RF receiver, or the like.

In the present disclosure, a "positioning module" is a module capable of determining a position of the mobile device. The positioning module may be, for example, a GPS receiver that utilizes GPS signals to determine location. As another example, the positioning module may determine the location of the mobile device based on triangulation of signals from cell towers, Wi-Fi networks or the like. Other positioning methods, which may provide a more or less precise location of the mobile device, may be utilized as well.

In the present disclosure, a "parking exit event" is an event in which a vehicle enters into a parking spot and vacates the parking spot. The parking exit event may be detected automatically, for example by a mobile device, or manually, for example by a user input. Parking exit event may be detected based on movements of the mobile device or other sensor. In some exemplary embodiments, an expected future occurrence of a parking exit event may be detected. Such a detection may be based on user input notifying a system that the user is returning to his parked vehicle. Additionally or alternatively, the detection may be performed automatically based on detecting a movement of the user while returning towards the parking spot of the vehicle. The parking spot may be detected automatically when the user had parked the vehicle (e.g., by a positioning module in response to a user command or fully automatically by a positioning module in response to an automatic detection of a parking event).

One technical problem dealt with by the disclosed subject matter is to provide a mechanism of matching between vacating parking spots and vehicles searching for parking. In particular, matching between the vacating parking spots and the drivers needs to be performed in a manner which would ensure that the matched driver enters to the parking spot and that a third party driver will not enter the parking spot instead.

One technical solution is to utilize an auction-based solution in which users leaving parking spots auction their parking spot between a community of drivers. Drivers searching for parking spot in the vicinity of the vacating parking spot may participate in the auction by biding. The winner may be directed towards the parking spot and once arriving, the parking spot may be vacated. In some exemplary embodiments, each bid may be associated with a compensation to the user, such as real money, funny money, credit, rating, or the like.

In some exemplary embodiments, once a winner of an auction is determined, the user vacating the parking spot may be provided with relevant information, including real time positioning information of the winner to allow the user to know when the winner will arrive at the parking spot. In some cases, when the winner arrives at the parking location, a notification to the user may be provided so as to indicate to the user that he can vacate the parking spot and allow the winner driver to park in the parking spot. In some cases, the notification may be provided after the winner has manually interacted with a UI element, such as a button, to manually indicate that he arrived and is waiting for the user to vacate the parking spot.

In some cases, the auction may be defined as relevant only to drivers in a certain distance measurement from the parking spot, so as to avoid having the user wait for a long time before vacating the parking spot. In some cases, the distance measurement may be an estimated arrival time at the parking spot (which may take into account traffic information, road information, or the like). Additionally or alternatively, the distance measurement may be driving distance to the parking spot. In some cases, after an auction is initiated, if there are now relevant bids, the relevant distance measurement threshold may be increased to allow additional drivers to participate in the real-time auction.

In some cases, the initiation of the auction may be automatic and may occur prior to the user arriving at his parked vehicle. For example, the mobile device of the user may gather information using its sensors, such as its position, acceleration readings, or the like. Based on the gathered information, it may be deduced that the user is returning to his parked vehicle, the location of which may be manually provided by the user or automatically determined at parking. In some exemplary embodiments, the selection of the winning bid may also be automatic, such as based on predefined rules. In such a case, the entire system may be automatic and may be utilized without user action or using minimal user interaction. In some cases, the auction may be initiated before the user arrives at the parked vehicle and may be defined as relevant for drivers that are estimated to arrive at the parking location before the user arrives to the parking spot so as to avoid having the user wait. As an example, assuming that the user is estimated to arrive at the parking spot within 97 seconds, only drivers that are estimated to arrive to the parking spot in no more than about 97 seconds (e.g., 90 seconds, 100 seconds, 110 seconds, or the like) may be allowed to participate. In some cases, the threshold defining the relevant drivers may defined as exactly or about the estimated arrival of the user (e.g., +10%, +20%, etc.). Additionally or alternatively, the threshold may be defined as about the estimated arrival of the user and no more than an additional delta, such as one minute, two minutes, five minutes, or the like.

In some cases, the selection of a winning bid in the auction may be manual by the user. The user may be presented with the bids and may select the winning bid based on his preference. In some cases, a Graphical User Interface (GUI) may be used to present the bids and their respective compensation. In some cases, the GUI may also display the distance measurement of each bid. In some cases, the bids may be ranked and/or ordered based on various parameters, such as but not limited to ranking of the bidding driver, compensation, distance measurement, combination thereof, or the like.

Another technical solution may be to enable a driver that is searching for parking to participate in an auction for parking. The participation may be performed using a mobile device of the driver. A list of active relevant auctions may be retrieved, such as from a server. The relevant auctions may be auctions in which the driver may participate. The relevant auctions may be auctions for spots in a proximity of the location of the driver, auctions for spots that are within some threshold distance measurement from the current location of the driver, or the like. In some cases, the relevant auctions may be auctions that are also in proximity to the target destination of the driver, such as within a threshold walking distance to the target destination. The threshold walking distance may be pre-defined by the driver, by the system, or the like.

In some cases, in case there are no relevant active auctions, the definition of "proximity" may be modified and the search may be increased for greater distances—walking distance, driving distance, or both.

A bid may be provided to one or more active auction. In some exemplary embodiments, the mobile device may provide the bid automatically, such as selecting an auction to bid on based on predetermined rules, and defining proposed compensation based on predetermined rules. The proposed compensation may be determined as a function of the driving distance from the current location to the parking spot, the walking distance from the parking spot to the target destination, combination thereof, or the like. Additionally or alternatively, the driver may be presented with the list of active auctions to select from and the driver may manually provide a bid to one or more auctions.

In case the driver wins in an auction, navigation directions may be provided to lead the driver to the parking spot. During such time, the location of the driver may be transmitted, directly or indirectly (e.g., via a server), to the user who is vacating the parking spot. Once the driver arrives at the parking spot, the driver may indicate manually to he has arrived and the user may then be notified to vacate the parking spot. Additionally or alternatively, the notification may be transmitted automatically. In some cases, the driver may be presented with information relating as to an ETA of the user, in case the user has not yet returned to the parking spot.

Referring now to FIG. 1 showing an illustration of a computerized environment, in accordance with some exemplary embodiments of the disclosed subject matter.

Computerized Environment 100 comprises a Server 130 connected to a Network 105, such as a Local Area Network (LAN), Wide Area Network (WAN), intranet, the Internet, or the like. Server 130 may be a processing device. Server 130 may be configured to obtain and process information from external sources, such as but not limited to mobile devices (e.g., Mobile Device 110, Mobile Device 120).

Mobile Device 110, such as a mobile phone, a PDA, a tablet, or the like, may send information to Server 130 via Network 105. In some exemplary embodiments, Mobile Device 110 may have a screen or other display system to display information to the user. In some cases, Mobile Device 110 may be a handheld device or otherwise carried by a user. In some exemplary embodiments, Mobile Device 110 may gather information by sensors. A sensor of Mobile Device 110 may be a device measuring any physical property, such as for example, an accelerometer, a positioning module, a gyroscope, a compass, a barometer, a photosensor, sound sensor (e.g., microphone), or the like. The sensors may include RF receivers, Bluetooth receivers or other receivers that are configured to receive signals from external devices, such as, for example, external devices deployed in vehicles, signaling devices deployed at parking spaces used to identify the parking space, or the like.

In some exemplary embodiments, Mobile Device 110 may obtain sensor readings useful for determining a mobility status of Mobile Device 110. "Mobility status" may be a status indicating a mode of movement of Mobile Device 110 or user holding Mobile Device 110. The mobility status may indicate a "driving" status (e.g., Mobile Device 110 is located within a vehicle that is being driven), a "walking" status (e.g., Mobile Device 110 is held by a person that is walking), a "non-driving" status (e.g., Mobile Device 110 is not located within a vehicle being driven), or the like. In some cases, the mobility status may be identified by readings of an accelerometer of Mobile Device 110 and identification of an acceleration curve that is indicative of the mobility status. However, the disclosed subject matter is not limited to such an embodiment, and other sensors may be utilized, such as, for example, a positioning module, in order to determine the mobility status of Mobile Device 110.

In some exemplary embodiments, Mobile Device 110 may be a device of a user (not shown). The identity of the user may or may not be known and available to Server 130. The user may use Vehicle 115. Vehicle 115 may be a vehicle for which parking spot is required, such as but not limited to a car, a bus, a truck, or the like. In some exemplary embodiments, the vehicle may require a parking location which comprises two or more spots, such as in case of a relatively large vehicle. In some exemplary embodiments, the disclosed subject may be applied to 2-wheeled vehicles, such as motorcycles, however as 2-wheeled vehicles may sometimes park on sideways and not in predestinated on-street locations, a system in accordance with the disclosed subject matter may exclude such vehicles.

In some exemplary embodiments, the user may use several vehicles at different times. Mobile Device 110 may determine automatically which vehicle is currently being used, such as based on its sensor readings. In some exemplary embodiments, methods and systems such as described in PCT/IL2014/050674, entitled "ASSOCIATING EXTERNAL DEVICES TO VEHICLES AND USAGE OF SAID ASSOCIATION", filed on 24 Jul. 2014, which is hereby incorporated by reference in its entirety, may be applied. In some cases, one vehicle may be associated with a parking zone and may have different parking rights than other vehicles of different parking zones (or having no parking zone).

Mobile Device 110 may automatically determine parking sessions and partial parking sessions, such as by detecting parking events and parking exit events and comparing their respective locations. Mobile Device 110 may send reports to Server 130 to notify Server 130 of the parking sessions. In some cases, Mobile Device 110 may also provide information regarding usage of parking payment system for the parking sessions. Additionally or alternatively, Mobile Device 110 may report user actions that cancel automatic actions proposed in accordance with the disclosed subject matter, so as to allow Server 130 to learn correct behavior.

Similarly, Mobile Device 120 may be associated with a driver of Vehicle 125. For the ease of explanation, below Mobile Device 110 is referred to as associated with the user vacating Vehicle 115 from the parking spot, and Mobile Device 120 is referred to as associated with the driver searching for parking for Vehicle 125. The user of Mobile Device 120 may be generally referred to as "driver". It will be understood, however, that each mobile device may be used at different times for different purposes.

Server 130 may be utilized to manage parking auctions. Mobile Device 110 may initiate an auction for a parking spot. In some exemplary embodiments, the auction may be initiated with a predetermined distance measurement which defines a maximal distance measurement (e.g., ETA, road distance, etc.) of the drivers who can participate in the auction.

Mobile Device 120 may query Server 130 to retrieve active auctions. In some cases, Mobile Device 120 may retrieve only relevant auctions, such as auctions for which Mobile Device 120 meets the maximal distance measurement criterion. In some exemplary embodiments, Mobile Device 120 may retrieve auctions for parking spots that are in the proximity of the location of Mobile Device 120, the proximity of the destination of the driver, combination thereof, or the like. The destination of the driver may be inferred automatically (e.g., based on past destinations, based on similar drivers) or provided manually, such as when using a navigation system. In some exemplary embodiments, Mobile Device 120 may provide to Server 130 a bid for an auction.

Server 130 may determine a winning bid in an auction. Additionally or alternatively, the winning bid may be determined, manually or automatically, by Mobile Device 110 who initiated the auction. Upon selecting a winning bid, the auction may be deemed as no longer being an active auction. Server 130 may notify the winning driver of winning the auction. Additionally or alternatively, upon selection of a winning bid all losing bidders may be notified.

It will be noted that Computerized Environment 100 is illustrated with one mobile device. However, the disclosed subject matter is not limited to such an arrangement and any number of mobile devices may be part of a computerized environment according to the disclosed subject matter.

Figure 2:
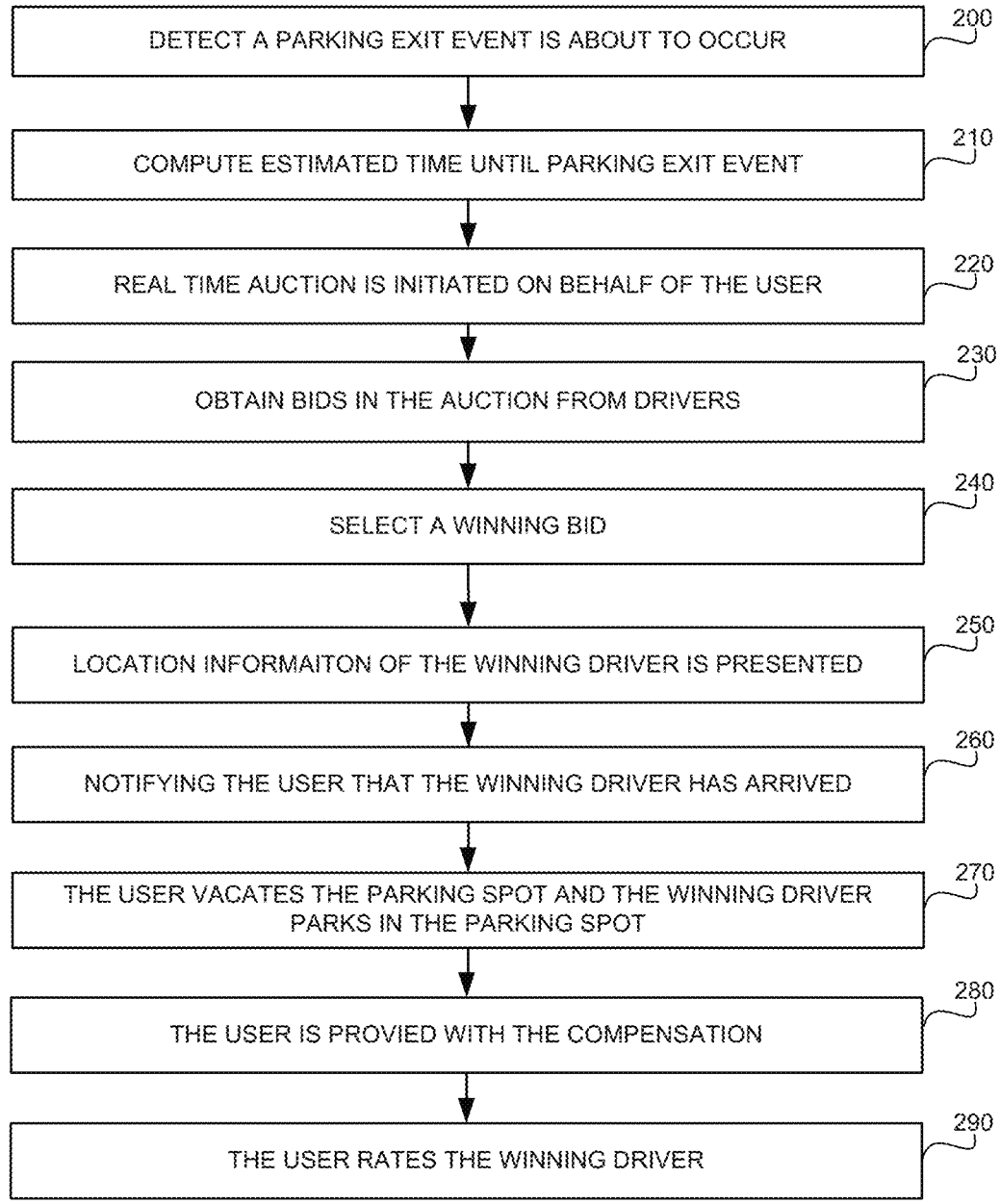
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

In Step 200, a mobile device may detect beforehand that a parking exit event is about to occur. The detection may be based on manual input by the user, such as indicating the user is returning to the parked vehicle. In one embodiment, the user may activate a "find my car" feature which is used to assist the user to return to the parked vehicle. Based on the activation of such a feature, the mobile device may determine that the parking exit event is about to occur. Additionally or alternatively, the detection may be automatic without user action. In some exemplary embodiments, the mobile device may analyze readings from its sensors, such as accelerometer, positioning module, or the like, to determine that the user is walking back to the parked vehicle. In some cases, a mobility status of the mobile device, such as a driving status, a walking status, a non-driving status, may be monitored continuously and be used to identify automatically parking events. Upon a detection of a change of the mobility status from a driving status to a non-driving status, a parking event may be determined and a positioning module may be activated to determine a location of the parking spot in which the vehicle has parked. After the user has left the parking spot, readings from the mobile device may be monitored to estimate whether or not the user is returning to the parked vehicle. Machine learning, such as supervised or non-supervised learning, may be utilized to improve the prediction for the user over time.

In Step 210, an estimated time until the parking exit event will occur may be determined. The estimated time may be an Estimated Arrival Time (ETA) to the parking spot, an ETA to the parking spot to which estimated exit maneuver time is added, or the like. In some exemplary embodiments, an Estimated Arrival Time (ETA) to the parked vehicle may be determined. The ETA may be determined based on estimated walking time from the current location of the mobile device (e.g., provided by a positioning module) to the parking spot. In some cases, walking speed may be estimated. In some exemplary embodiments, machine learning may be utilized to improve prediction for the user over time, such as in case the user walks faster than an average user, walks slower, or the like. In some cases, walking speed may be different in different terrains, at residential v. industrial areas, or the like.

In Step 220, an auction for the parking spot may be activated. The auction may be initiated manually or automatically.

In some cases, the auction may be initiated manually by the user indicating he is interested in auctioning the parking spot. The user may define manually a maximal distance measurement threshold for participating in the auction (e.g., a maximal amount of waiting time at the vehicle he is willing to wait until vacating the vehicle), a minimal compensation for the parking spot, or the like.

Additionally or alternatively, the auction may be initiated automatically without user action. The automatic auction may be defined based on pre-existing rules. In some exemplary embodiments, the maximal distance measurement threshold for the auction may be based on the ETA computed at Step 210. For example, the maximal distance measurement may be exactly the estimated walking time to the parked vehicle so as to avoid the user having to wait to vacate the parking spot. Additionally or alternatively, the maximal distance measurement may be based on the ETA, such as 20% over the estimated walking time, the estimated walking time plus five minutes, or the like. A minimal compensation may be defined automatically to the auction. The minimal compensation may be determined based on rules, such as preset rates for parking spots, which may be relevant to all parking spots, to parking spots in specific areas, to specific parking spots, or the like. The minimal compensation may be determined also based on a history of auctions. In some cases, the user may manually modify any automatically defined parameter. Based on past modifications, future compensation rates may be determined (e.g., using machine learning techniques).

In Step 230, bids from drivers participating in the real-time auction may be obtained. Each bid may comprise a compensation. In some exemplary embodiments, a bid may also comprise a current location of the driver, a ranking of the driver (e.g., ranked by the community in past parking transactions), a distance measurement between the driver and the parking spot (e.g., ETA, road distance, etc.), or the like.

In Step 240, a winning bid may be selected. In some exemplary embodiments, the winning bid may be selected automatically based on rules. In some cases, the automatic selection may be provided as a suggestion for the user to confirm. In some cases, the selection of the winner may be automatically performed by a server, which may take into account all active auctions. Additionally or alternatively, the selection may be automatically performed by a mobile device of the user.

Figure 3:
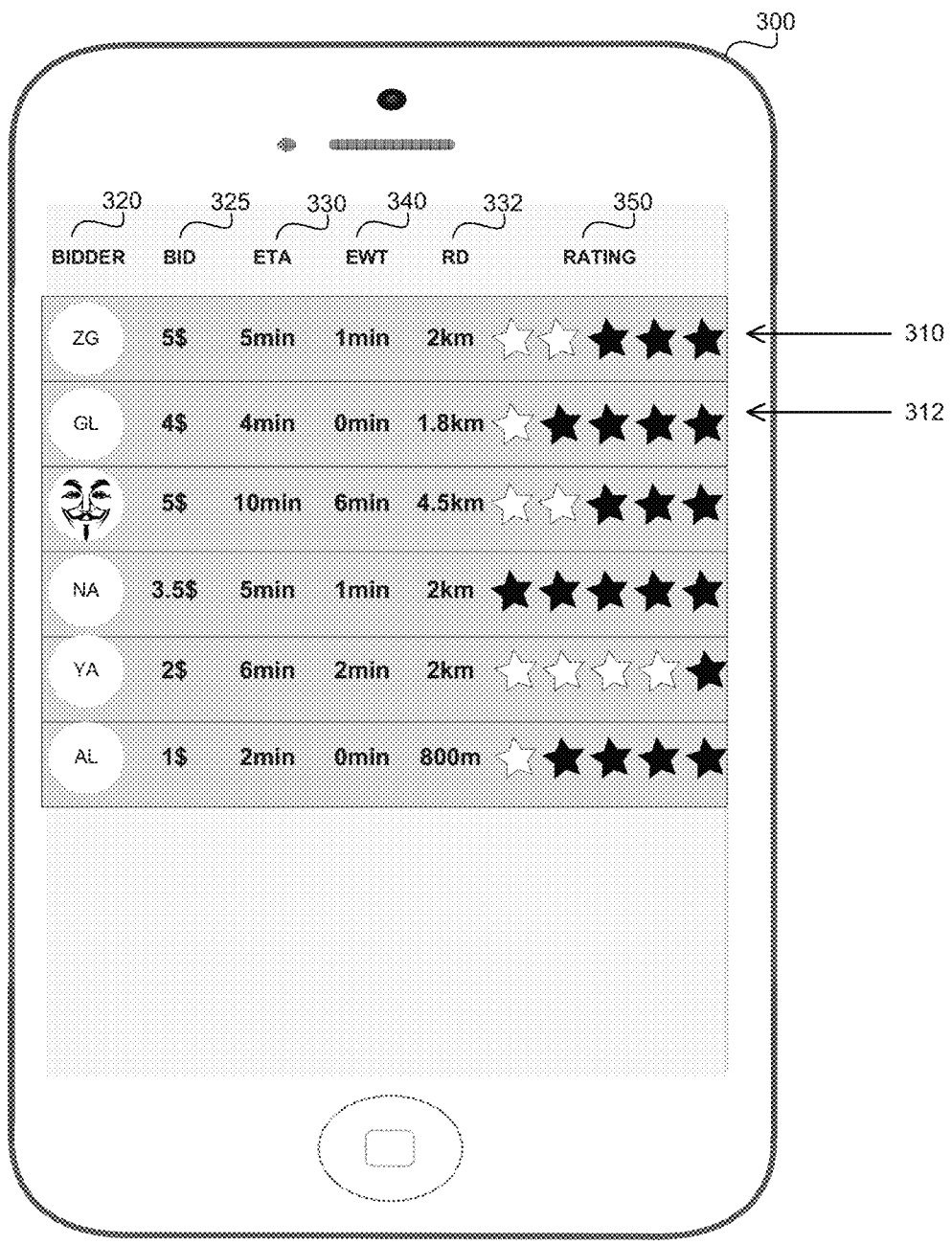
FIG. 3 shows a GUI, in accordance with some embodiments of the disclosed subject matter.

Additionally or alternatively, the selection of the winning bid may be a manual selection. The user may be presented with the bids in a GUI and the user may select the winning bid from the displayed bids. FIG. 3, which is discussed hereinbelow, exemplifies a GUI in accordance with some embodiments of the disclosed subject matter.

In Step 250, the user may be presented with current location information of the winning driver. The user may be presented with a map in which the current location of the winning driver is displayed. Additionally or alternatively, the location of the parking spot may be displayed on the map. Additionally or alternatively, the location of the user may be displayed on the map. In some exemplary embodiments, a display of the mobile device may be used to show the map in a GUI. In some exemplary embodiments, the GUI may also indicate ETA of the winning driver to the parking spot, ETA of the user to the parking spot, or the like. The map may be updated in real time to allow the user to track the winning driver and be aware of when the driver is expected to arrive so as to vacate the parking spot in a correct timing.

In some exemplary embodiments, the GUI may indicate a vehicle make and model of the winning driver to allow for the user to recognize the winning driver. A photograph of the vehicle and/or winning driver may be displayed.

In Step 260, upon the wining driver arriving to the parking spot, a notification may be provided to the user. The notification may be provided automatically based on a determination that the winning driver is located near the parking spot (e.g., within a 10 meters radius, 50 meter radius, or the like). Additionally or alternatively, the winning driver may interact with a GUI element, such as press a GUI button, to indicate that he arrived at the parking spot and is waiting for the parking spot to be vacated.

In Step 270, the user vacates the parking spot and the winning driver parks in the parking spot.

In Step 280, a transaction is completed and the compensation is provided to the user. The compensation may be provided using third-party payment systems, using e-wallet or the like. In some cases, the transaction is completed using Near-Field Communication (NFC).

In Step 290, the user may rate the winning driver. The rating may indicate for other users in the future whether or not they should accept bids from the winning driver. As an example, the rating may be low if the winning driver refuses to complete the transaction or decides to try and reduce the compensation.

In some exemplary embodiments, the winning driver or the user may cancel the winning bid or the auction after the winning bid is selected and before the transaction is completed. In such a case, one party may wish to rate the other using a low rating.

Referring now to FIG. 3 showing a GUI, in accordance with some embodiments of the disclosed subject matter.

GUI 300 presents bids to the auction of the user. As an example. Item 310 represents a bid by one driver and Item 312 represents a bid by another driver. Each item may indicate the driver (e.g., using initials, avatar, or the like). In some exemplary embodiments, an identity of a bidder may remain anonymous. Each item may indicate a compensation (325) proposed by the bidding driver (320). Each item may indicate a distance measurement, such as for example, both an ETA (330) and Road Distance (RD) (332). Each item may indicate an Estimated Waiting Time (EWT) (340). Assuming the estimated walking time of the user until reaching the parking spot is 4 minutes, the EWT may be ETA minus 4 minus, but not smaller than zero. Each item may indicate a rating of the driver (350)

In some exemplary embodiments, the GUI presents the bids in an ordered manner. The order may be based on automatic ranking of the bids. The ranking may be based on the compensation, the distance measurement, the driver rating, combination thereof, or the like. For example, the ranking may favor any bid for which the distance measurement is below the estimated walking time of the user to the parking spot. The ranking may be indifferent of whether or not the driver will have to wait by the parking spot. For example, in case the estimated walking time is 5 minutes, the ranking may favor a bid having an ETA of 4 minutes over a bid having an ETA of 10 minutes. However, bids having ETA of 4 minutes and of 3 minutes may be considered equivalent. The ranking may favor higher compensation. The ranking may favor higher driving ranking. In some cases, the compensation of X units may be equivalent to waiting addition Y time units. For example, one user may define that one minute is equivalent to one USD. For such a user, a bid for which he would have to wait 2 minutes and receive compensation of 2 USD is ranked the same as a bid for which he would have to wait 4 minutes and receive compensation of 4 USD.

Figure 4:
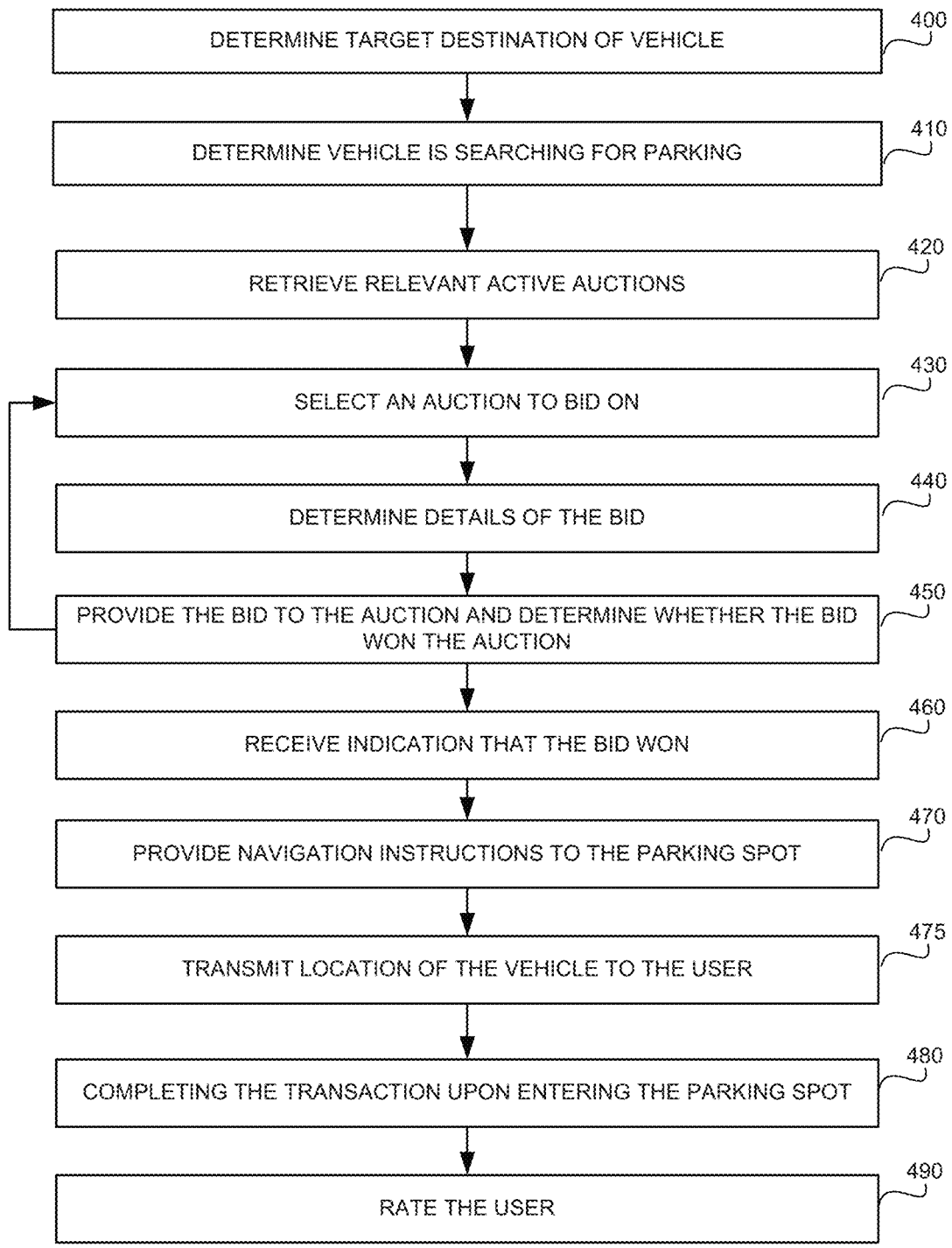
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

In Step 400, a target destination of a vehicle may be determined. The target destination may be provided by the user, such as when inputting a target to a navigation system. Additionally or alternatively, the target destination may be determined automatically, such as based on the history of the driver and potentially similar drivers.

Machine learning and big data analysis techniques may be used to provide for an automatic prediction of the target destination. In some exemplary embodiments, the driver may verify or modify a predicted target destination.

In Step 410, it may be determined that the vehicle is searching for parking. The determination that the vehicle is searching for parking may be based on user input, such as turning on a parking assistance mechanism, or automatic, such as based on movements of the vehicle as sensed by a mobile device. The automatic determination that the vehicle is searching for parking may be performed in a similar manner to that disclosed in PCT/IL2014/050672, "Parking Occupancy Estimation" to Anagog LTD, filed 24 Jul. 2014, which is hereby incorporated by reference in its entirety for all purposes.

In Step 420, a list of active auctions for parking spots that are relevant for the driver of the vehicle is retrieved. The list of active auctions may be retrieved from a server, such as Server 130 of FIG. 1. The active auctions may be auctions in which the driver can participate. The active auctions may be auctions that are in the proximity of the present location of the vehicle and the target destination of the driver. In some cases, the driver may want to optimize the total ETA to the destination. The time to the destination is comprised of both ETA to the parking spot and estimated walking time from the parking spot to the target destination.

In some exemplary embodiments, some active auctions may be of users vacating parking spots, while others may be of other players, such as parking lot owners. In some exemplary embodiments, a parking lot owner may initiate an auction for a parking spot in the lot and allow drivers to bid for the parking within the parking lot. The compensation may be a price that may be higher or lower than the usual rate. As an example, the price may be lower in case there is low occupancy of the parking lot. In some exemplary embodiments, the parking lot owner can initiate the auction automatically based on predetermined rules and conditions, manually, such as through a web interface or a mobile app, or the like.

In Step 430, an auction may be selected from the active auctions. The auction may be selected automatically, such as based on predetermined rules and without user action. Additionally or alternatively, the auction may be selected by the driver. The driver may be presented with a list of the active auctions on a display of the mobile device. In some cases, ETA to the parking spot may be displayed for each active auction. Additionally or alternatively, estimated walking time from the parking spot to the target destination may be presented. Additionally or alternatively, a rating of the user who owns the auction may be presented, such as the accumulated rating of the user from the community in past transactions. For example, in case the user cancels auctions after having a winning bid, or in case the user does not honor his commitment in an auction to wait for the vehicle to arrive to the parking spot before vacating the parking spot, the community may rank the user with low grades.

In Step 440, details of a bid may be determined. The details may include the compensation. In some exemplary embodiments, the details may be provided manually by the driver. Additionally or alternatively, the details may be provided automatically. In some exemplary embodiments, the compensation may be computed automatically or may be determined in accordance with predetermined rules. As an example, the compensation may be computed automatically, by the mobile device or by the server. The computed compensation may be computed based on a distance measurement between the location of the vehicle and a location of the parking spot and based on the a distance measurement between the location of the parking spot and the target destination. In some exemplary embodiments, the compensation may be computed so as to provide a higher compensation when the estimated arrival time to the target destination is the lowest. The estimated arrival time to the target destination may be comprised of the time until arriving in the parking spot and walking time from the parking spot to the target destination. In some exemplary embodiments, the following formula may be used: $(C_1 \cdot T_{driving} + C_2 \cdot T_{walking})$, where C1 and C2 are some parameters and $T_{driving}$ is an estimated driving time and $T_{walking}$ is estimated walking time. In some exemplary embodiments, a minimal value for the above-mentioned formula may determined for all candidates. In some exemplary embodiments, a candidate may only be one with driving time below a threshold (e.g., 2 minutes) and walking time below another threshold (e.g., 5 minutes). In some exemplary embodiments, the compensation may be higher in case of a dense area in which there are few available parking spots. In some exemplary embodiments, the compensation may be computed while taking into account a median, average or common compensation of a winning bid in the neighborhood or in the area of the parking spot. Such statistical information may be made available by a server, such as 130 of FIG. 1. In some exemplary embodiments, the computed compensation may take into account a number of active auctions that are relevant for the driver, so as if there are many contingences to the selected auction, the computed compensation may be lower than the compensation in case there are few alternatives. In some exemplary embodiments, the driver may define a maximal compensation. Additionally or alternatively, the driver may manually modify computed compensation and the disclosed subject matter may utilize machine learning techniques to adapt to the preferences of the driver.

In Step 450, the bid may be provided and an indication of whether or not the bid had won in the auction. In some exemplary embodiments, Steps 430-450 may be performed with respect to many auctions concurrently or sequentially. In case the one or more bids of the driver do not win in any auction, Steps 430-450 may be performed again and the proposed compensation may be increased to increase the likelihood of winning in an auction. Information regarding the winning bids may also be obtained and used to optimize future bids of the driver.

In Step 460, an indication that a bid won in an auction is received. The indication may be received from a server, such as Server 130. In some exemplary embodiments, all other pending bids of the driver may be canceled so as to avoid having the driver win in two or more auctions.

In Step 470, navigation instructions may be provided to the driver to direct the driver to arrive at the parking spot.

In Step 475, the mobile device may continuously transmit the location of the vehicle of the driver. The location information may be obtained by a positioning module of the mobile device. The location information may be transmitted directly to the mobile device of the owner of the auction or indirectly, such as via Server 130. The information may be transmitted every 10 seconds, 15 seconds, 1 minute, or the like. The owner of the auction may be presented with the location information and the owner may be able to track the location of the driver until arriving at the parking spot. The transmission may be stopped when the driver arrives at the parking spot. In some exemplary embodiments, arrival at the parking spot may be detected automatically or may be indicated manually by the driver. Additionally or alternatively, the driver may cancel the transaction and the location information will no longer be transmitted.

In Step 480, upon arriving at the parking spot, and entering the vacated parking spot, the transaction may be completed and the compensation may be provided to the user who vacated the vehicle.

In Step 490, the driver may rate the user. The rating may indicate for other drivers in the future whether or not they should participate in auctions of the user. As an example, the rating may be low if the user refuses to complete the transaction, if he vacated the parking spot prematurely, took a long time to vacate the parking spot, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    while a vehicle is searching for parking, participating in a real-time auction for a parking spot, wherein said participating is performed by a mobile device of a user located within the vehicle, wherein said participating comprises:
        retrieving from a server a list of active auctions for parking spots in a proximity of a present location of the vehicle and in a proximity of a target destination of the user, wherein the present location of the vehicle is determined based on one or more location sensor readings from the mobile device, wherein, for each auction owner having a listed auction for a certain parking spot in the list of active auctions for parking spots, an estimated walking duration of the auction owner to the certain parking spot in addition to a maximal waiting time of the auction owner for the user is below an estimated arrival duration of the user to the certain parking spot, wherein the estimated walking duration is determined based on readings from a positioning module of a mobile device of the auction owner, wherein the estimated arrival duration of the user to the certain parking spot is determined based on a distance measurement between the present location of the vehicle and a location of the certain parking spot;
        selecting an auction from the list of active auctions; and
        providing a bid for the parking spot in the auction.

2. The method of claim 1 further comprising, in response to receiving an indication that the bid is a winning bid in the auction, continuously transmitting, directly or indirectly, current locations of the vehicle to an owner of the auction, whereby the owner of the auction can track the vehicle.

3. The method of claim 2, wherein said continuously transmitting is stopped upon the vehicle arriving at the parking spot in the auction that was selected.

4. The method of claim 2, wherein said continuously transmitting is stopped in response to a command of the owner of the auction.

5. The method of claim 1, wherein said selecting the auction and said providing the bid in the auction are performed automatically based on predetermined rules.

6. The method of claim 1, wherein said selecting and said providing are performed repeatedly until a provided bid wins in a selected auction.

7. The method of claim 1, wherein said providing the bid comprises: automatically computing, by the mobile device, a compensation to be offered in the bid, wherein the compensation is computed based on a distance measurement between the present location of the vehicle and a location of the parking spot in the auction that was selected and based on a distance measurement between the location of the parking spot and the target destination.

8. The method of claim 1 further comprising automatically determining that the vehicle is searching for parking without receiving user input, wherein said determining is based on movements of the vehicle.

9. The method of claim 1, wherein said participating is performed automatically without user input, whereby a matching parking spot is detected automatically for the user, wherein:
  the list of active auctions for the parking spots is automatically retrieved from the server;
  said selecting the auction from the list of active auctions is performed automatically based on predetermined rules;
  said providing the bid comprises automatically computing the bid based on the distance measurement between the present location of the vehicle and the location of the parking spot in the auction that was selected and based on the distance measurement between the location of the parking spot and the target destination;
  upon losing the auction, automatically repeating said selecting and said providing until a provided bid wins in a selected auction; and
  upon winning the selected auction, in response to said participating, displaying to the user one or more navigation instructions towards the matching parking spot.

10. The method of claim 1, wherein the list of active auctions comprises a first auction and a second auction, wherein the first auction is an auction for a first parking spot that is about to be vacated, wherein the second auction is an auction for a second parking spot within a parking lot.

11. A computer program product comprising a non-transitory computer readable storage medium retaining program instructions, which program instructions when read by a processor, cause the processor to perform:
  while a vehicle is searching for parking, participating in a real-time auction for a parking spot, wherein said participating is performed by a mobile device of a user located within the vehicle, wherein said participating comprises:
    retrieving from a server a list of active auctions for parking spots in a proximity of a present location of the vehicle and in a proximity of a target destination of the user, wherein the present location of the vehicle is determined based on one or more location sensor readings from the mobile device, wherein, for each auction owner having a listed auction for a certain parking spot in the list of active auctions for parking spots, an estimated walking duration of the auction owner to the certain parking spot in addition to a maximal waiting time of the auction owner for the user is below an estimated arrival duration of the user to the certain parking spot, wherein the estimated walking duration is determined based on readings from a positioning module of a mobile device of the auction owner, wherein the estimated arrival duration of the user to the certain parking spot is determined based on a distance measurement between the present location of the vehicle and a location of the certain parking spot;
    selecting an auction from the list of active auctions; and
    providing a bid for the parking spot in the auction.

12. The computer program product of claim 11, wherein the program instructions, when read by the processor, further cause the processor to perform: in response to receiving an indication that the bid is a winning bid in the auction, continuously transmitting, directly or indirectly, current locations of the vehicle to an owner of the auction, whereby the owner of the auction can track the vehicle.

13. The computer program product of claim 12, wherein said continuously transmitting is stopped upon the vehicle arriving at the parking spot in the auction that was selected.

14. The computer program product of claim 12, wherein said continuously transmitting is stopped in response to a command of the owner of the auction.

15. The computer program product of claim 11, wherein said selecting the auction and said providing the bid in the auction are performed automatically based on predetermined rules.

16. The computer program product of claim 11, wherein said selecting and said providing are performed repeatedly until a provided bid wins in a selected auction.

17. The computer program product of claim 11, wherein said providing the bid comprises: automatically computing, by the mobile device, a compensation to be offered in the bid, wherein the compensation is computed based on a distance measurement between the present location of the vehicle and a location of the parking spot in the auction that was selected and based on a distance measurement between the location of the parking spot and the target destination.

18. The computer program product of claim 11, wherein the program instructions, when read by the processor, further cause the processor to automatically determine that the vehicle is searching for parking without receiving user input, wherein the determination that the vehicle is search for parking is based on movements of the vehicle.

19. The computer program product of claim 11, wherein said participating is performed automatically without user input, whereby a matching parking spot is detected automatically for the user, wherein:
  the list of active auctions for the parking spots is automatically retrieved from the server;
  said selecting the auction from the list of active auctions is performed automatically based on predetermined rules;
  said providing the bid comprises automatically computing the bid based on the distance measurement between the present location of the vehicle and the location of the parking spot in the auction that was selected and based on the distance measurement between the location of the parking spot and the target destination;
  upon losing the auction, automatically repeating said selecting and said providing until a provided bid wins in a selected auction; and
  upon winning the selected auction, in response to said participating, displaying to the user one or more navigation instructions towards the matching parking spot.

20. A computerized apparatus having a processor, the processor being adapted to perform the steps of:
  while a vehicle is searching for parking, participating in a real-time auction for a parking spot, wherein said participating is performed by a mobile device of a user located within the vehicle, wherein said participating comprises:
    retrieving from a server a list of active auctions for parking spots in a proximity of a present location of the vehicle and in a proximity of a target destination of the user, wherein the present location of the vehicle is determined based on one or more location sensor readings from the mobile device, wherein, for each auction owner having a listed auction for a certain parking spot in the list of active auctions for parking spots, an estimated walking duration of the auction owner to the certain parking spot in addition to a maximal waiting time of the auction owner for the user is below an estimated arrival duration of the user to the certain parking spot, wherein the estimated walking duration is determined based on readings from a positioning module of a mobile device of the auction owner, wherein the estimated arrival duration of the user to the certain parking spot is determined based on a distance measurement between the present location of the vehicle and a location of the certain parking spot;

selecting an auction from the list of active auctions; and providing a bid for the parking spot in the auction.

* * * * *